Patented Aug. 9, 1932

1,871,135

UNITED STATES PATENT OFFICE

HARRY STEENBOCK, OF MADISON, WISCONSIN, ASSIGNOR TO WISCONSIN ALUMNI RESEARCH FOUNDATION, A CORPORATION OF WISCONSIN

ANTIRACHITIC PRODUCT AND PROCESS

No Drawing.    Application filed December 27, 1926.   Serial No. 157,429.

The present invention or discovery pertains to a method of antirachitically activating cereals and cereal products, such as meals, starches, flours, breakfast foods, etc., and to the products obtained by such method of treatment.

The present application is a continuation-in-part of my application Serial No. 723,171, filed June 30, 1924, issued as Patent No. 1,680,818, and claims are included herein for subject matter originally disclosed in the application here mentioned.

In accordance with the method herein described, it is possible to activate cereals and cereal products, such as corn, oats, rice, and meals, breakfast foods, etc. prepared therefrom. These substances contain unsaponifiable lipoids, known as phytosterols, which can be antirachitically activated, as can, also, the unsaponifiable lipoid of animal origin, known as cholesterol. These substances belong to a class known as sterols. There is reason to believe that other substances contained in animal and vegetable matter are capable of being activated. It has been found that grains, cereals and their solid products, after irradiation with ultra violet rays in accordance with the present process, possess antirachitic properties. That is, when such treated products are used by man or animals as food, they serve to prevent rachitis, or rickets, or to effect cure thereof.

Cod liver oil is known to possess antirachitic properties. Cereals and cereal products, after antirachitic activation, serve the same function in this respect as cod liver oil and are unobjectionable from the standpoint of taste and odor.

The unsaponifiable lipoids may be separated from the other constituents of cereals, and may be activated after such separation, if desired, thus producing an antirachitic essence. However, such an essence may be more cheaply and satisfactorily produced from other sources, for example, by separating the unsaponifiable lipoids (cholesterol) from the brains of animals, or by separating the unsaponifiable lipoids from fatty oils which are quite rich in such lipoids, and then subjecting the separated lipoids to antirachitic activation.

In dealing with cereals, and cereal products, such as breakfast foods, it is deemed most practicable to treat the cereal, or the cereal product, such as meal, etc., rather than to first effect separation of the lipoids. It may be remarked, however, that it is feasible to treat a given quantity of a cereal, for example, and then mix the treated cereal with additional cereal, thus producing a cereal which is mildly antirachitic, but, nevertheless, possesses sufficient of the antirachitic principle to serve the desired purpose where such cereal is eaten daily.

The activation is effected by subjecting the cereal or cereal product to the action of ultra violet rays, or light rich in such rays, such as is produced by a quartz murcury vapor lamp.

As an example, small grains or cereals, millet seed, corn meal, or materials of this character may be activated antirachitically by subjecting a thin stream or layer to the action of the rays of a Cooper-Hewitt quartz mercury vapor lamp, type BY, for about thirty minutes, such lamp having an arc varying from about 1½ inches initially to about 3 inches and operated by a current of about four amperes at about 48 volts, the source of light being placed at a distance of about two feet or somewhat less from the material. The treatment may be continued for two hours or even longer without detriment. It is to be observed, however, that it is possible, in treating some foods, by over exposure, to destroy the antirachitic principle after it has been produced. Generally, exposure, under conditions stated, for a period of two hours or less will sufficiently activate the material. Ordinarily, a period of ten to twenty minutes is preferred. Undue prolongation of the treatment tends to destroy the antirachitic factor and injure or destroy palatability of the product. This should be avoided. It was found, for illustration, that the antirachitic factor of cod liver oil was destroyed by about seventeen hours treatment when a film of the oil about ⅛ inch thick was irradiated under the conditions stated above; also the antirachitic factor was greatly weakened by ten hours of such treatment. The same statements apply to artificially activiated olive oil. The same principle applies to antirachitically activated cereals, although it may be said that a stronger or more prolonged treatment can be given to cereals than to oils without destroying the antirachitic principle. Undue prolongation of the treatment will injure or destroy palatability. In some cases, noticeable injury to palatability may occur after thirty minutes treatment.

The length of time of exposure to the rays may vary greatly, depending on the volume of material being treated, the fineness of the granulation of the material within certain elements, the manner in which the material is exposed, the intensity of the light, and the distance of the material from the light. In the case of cereals having large kernels, such as corn, it is preferred to break or granulate the kernels before exposure to the ultra violet rays. In the same manner, wheat, oats, etc. may be broken, pulverized, or rolled before being subjected to the treatment, the purpose being to put the materials in condition to be more redaily and more thoroughly irradiated.

According to the present invention, feeds for animals, and food products for man, and medicines for man and animals, may have imparted to them the antirachitic factor, or may be rendered antirachitically active by subjecting them to the action of ultra violet rays. It has been found that a ration of corn 33, wheat 33, wheat gluten 15, gelatin 15, sodium chloride 1 and calcium carbonate 3 produces in rats, within a period of a few weeks, distinct rachitic conditions. On the other hand, such a ration, when properly activated or supplied with activated material, will maintain the proper growth and bone structure. The irradiation of such a ration can be effected in the manner described above, or, if desired, an ingredient which is to enter into the ration may be irradiated and then incorporated within the ration.

From the description and statement thus far given, it will be understood that the invention is important from various standpoints. The use of an activated feed for chickens. cattle, and other stock, would have a two-fold object: it would enhance the economic production of pork, beef and chickens, together with eggs, milk, etc.; and it would tend to increase the antirachitic content of these products and thus benefit man indirectly.

For man, the use of activated cereals and cereal products has a direct value. Thus, the process is applicable to manufactured breakfast foods, starch, yeast, flour, meals, brans, etc.; and the general use of these substances in activated condition will tend strongly to improve health and prevent rachitis. By the general use of activated food by the lactating mother, the anti-rachitic properties of milk will tend to be increased, thus minimizing the early incidence of rickets in the child, and obviating the various defects in the child which arise from a rachitic condition. Again, the child itself may be fed, at an early age, on grain extracts, or other cereal preparations, which have been activated by light, or which have admixed therewith activated substances.

The time and manner of exposure of the food or material to the action of the ultra violet rays must be varied with the nature of the material exposed and various other factors, as suggested above. These factors will readily be determined by those skilled in the art, in view of the explanation given above; and, in actual practice, activated materials may be subjected to actual tests from time to time to insure proper manufacture. Grains, cereals, and their various products, may be exposed in a thin layer on conveyor belts, or in thin flowing streams, and subjected to the action of a succession of mercury vapor lamps, the arrangement being such as to provide for the necessary exposure during the movement of the materials within the range of the action of the battery of lamps. The ultra violet rays pass most readily through quartz, and it is to be borne in mind that if the exposure is made through other materials, the intensity of the light may be varied thereby, and thus a longer period of iradiation may be necessary to effect the desired antirachitic activation.

As another illustration, it may be stated that a ration of millet seed 84, casein 12 and salts 4, when subjected to treatment by ultra violet light for thirty minutes, under substantially the conditions mentioned above, was greatly improved in its power to support growth in the rat. In has been found that improved growth and proper formation of bone occur concurrently as the result of activation of the food in the manner herein described. It has been definitely established that the irradiated ration will serve to cure rachitic bone. It has been established, both chemically and by bone appearance, that the calcium metabolism may be maintained at the normal by use of activated foods or materials under various conditions when it is difficult for the animal, for one reason or another, to maintain the proper growth and structure of the bone without such aid.

The process is applicable to grains, cereals, seeds, etc., generally, and to food products prepared therefrom. Grains, roughage, or mixtures thereof, may be irradiated and have imparted to them the antirachitic factor. Baked cereal products, dog biscuit, etc. may be similarly activated. Peas, beans, and meals prepared therefrom may be activated. Sterilization is not accomplished in effecting antirachitic activation.

It may be stated here that the activated material maintains the activated condition for prolonged periods; and, while it has not been determined what rate of loss, if any, may occur, the activated condition is maintained for a sufficient length of time for the practical purposes suggested herein.

Sunlight contains ultra violet rays, but is not sufficiently rich therein to enable sunlight, ordinarily, to be employed practically in antirachitically activiating foods. The use of an artificial light, rich in the rays of the ultra violet region of the spectrum, practically, is desirable, and the quartz mercury vapor lamp seems best adapted to the purpose. The light from such a lamp has rays varying in wave-length from about 185 to 800, or more, millimicrons, and is rich in ultra violet rays. The rays which are highly effective in the present process have a wave-length within the range of 230 to 315 millimicrons. Roentgen rays, which have a wave-length of 50 millimicrons, or less, will not effect antirachitic activation.

In the accompanying claims, the expressions "cereals" and "cereal products" are to be understood as broad enough to include grains, cereals, seeds and their various solid products, as well as mixtures of such materials.

The foregoing detail description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of preparing antirachitic food substances which comprises: subjecting cereals, solid cereal products, etc. to the action of ultra violet rays, such as emanate from a quartz mercury vapor lamp, for a period sufficient to effect antirachitic activation but so limited as to avoid subsequent substantial injury to the antirachitic principle and/or palatability.

2. The process set forth in claim 1 as applied to cereal products in broken or comminuted condition.

3. Cereal and cereal products antirachitically activated in the manner set forth in claim 1.

4. Breakfast foods containing an antirachitically activated cereal product, which has been thus activated directly by artificially produced ultra-violet rays.

HARRY STEENBOCK.